United States Patent
Yu et al.

(10) Patent No.: US 10,142,986 B2
(45) Date of Patent: Nov. 27, 2018

(54) UPLINK RESOURCE SHARING METHOD, BASE STATION AND TERMINAL

(71) Applicant: SHANGHAI RESEARCH CENTER FOR WIRELESS COMMUNICATIONS, Shanghai (CN)

(72) Inventors: Han Yu, Shanghai (CN); Rui Wang, Shanghai (CN); Yameng Li, Shanghai (CN); Yang Yang, Shanghai (CN); Honglin Hu, Shanghai (CN); Haifeng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 150 days.

(21) Appl. No.: 15/166,836

(22) Filed: May 27, 2016

(65) Prior Publication Data
US 2017/0230968 A1    Aug. 10, 2017

(30) Foreign Application Priority Data
Feb. 6, 2016 (CN) .......................... 2016 1 0084373

(51) Int. Cl.
H04W 72/14    (2009.01)
H04W 72/04    (2009.01)

(52) U.S. Cl.
CPC ....... *H04W 72/0446* (2013.01); *H04W 72/14* (2013.01)

(58) Field of Classification Search
CPC .......................... H04W 72/0446; H04W 72/14
See application file for complete search history.

(56) References Cited

U.S. PATENT DOCUMENTS

2016/0278050 A1* 9/2016 Nory ...................... H04W 16/14
2017/0019909 A1* 1/2017 Si ......................... H04W 76/048

* cited by examiner

*Primary Examiner* — Yemane Mesfin
*Assistant Examiner* — Henry Baron
(74) *Attorney, Agent, or Firm* — WPAT, PC

(57) ABSTRACT

The present invention discloses an uplink resource sharing method, base station and terminal, wherein, the uplink resource sharing method comprises: performing the LBT on a granted subframe, allocated to a terminal by a base station, by the terminal; transmitting data if the LBT is finished on the granted subframe; and performing the LBT on another subframe if the LBT is not finished on the granted subframe. The present invention solves the problem of resource waste caused by the fact that the terminal cannot finish LBT in a frame allocated to the frame by a base station, and reduces a probability of increase of an uplink grant number caused by failing of uplink scheduling.

10 Claims, 10 Drawing Sheets

UPLINK RESOURCE SHARING METHOD, BASE STATION AND TERMINAL

BACKGROUND

Technical Field

The present invention relates to an uplink resource sharing method, in particular to a Licensed Assisted Access (LAA) based uplink resource sharing method, and further relates to a corresponding base station and terminal, which belong to the technical field of wireless communication.

Related Art

The 3GPP conference provides an LAA technical solution, an LTE is deployed to a non-granted frequency band by a carrier aggregation manner, the LTE is enabled to use a resource of a non-granted frequency spectrum to communicate, thus improving a frequency spectrum use ratio and realizing improvement of a rate and capacity.

In an LAA and Wi-Fi coexisting heterogeneous network scene, the LAA and Wi-Fi contend for the non-granted frequency band. When the LAA uses a subcarrier scheduling manner, an uplink grant of the LTE is transmitted in a PDCCH, and downlink transmission and uplink transmission require LBT (listen-before-talk), which means every time the LAA performs once successful uplink transmission, twice LBT is at least required, thus greatly reducing a successful rate that the LAA obtains an uplink transmission chance and indirectly leading to waste of a downlink resource transmitting the uplink grant.

An access channel mechanism of an LAA device contains three LBT: category 2: an LBT without random back-off, owning a fixed random back-off counter value; (2) category 3: an LBT with random back-off with a contention window of fixed size, wherein a back-off counter value is a random value in the contention window range; (3) category 4: an LBT with random back-off with a contention window of variable size, wherein a back-off counter value is a random value in the contention window range. According to a proposal discussion of the IEEE conference and the 3GPP conference, when containing PDSCH transmission, the category 4 LBT mechanism is a reference of downlink LBT.

A flow chart of the category 4 LBT mechanism is as shown in FIG. 1, wherein the range of the contention window (sizes of X and Y) are configurable, and dynamic or semistatic change can be performed based on feedback information of a user and detection of a base station. As shown in FIG. 1, when a device transmits data, once initial CCA (iCCA) is performed, and its setting refers to a deter period in Wi-Fi. If an iCCA detection channel is idle, data is transmitted, if the iCCA channel is busy, a back-off counter N is generated between X and Y and enters an extended CCA stage (eCCA). After the eCCA begins, whether the channel is idle is detected in a defer period, if yes, a back-off stage is performed, and N is operated, namely N subtracts 1 according to a channel condition detected in each CCA time slot. When the eCCA process is interrupted by some process, namely, the channel is detected to be busy in some channel, the device does not operate the counter till waiting for a defer period and the channel is idle. A self back-off process begins from ③, namely, when after N is 0, no data is directly transmitted and another CCA detection circulation is performed.

When performing uplink scheduling, the LTE issues an uplink grant signaling (UL grant) according to an uplink data request of UE to distribute transmission resource for the UE, and the base station usually schedules the uplink resource of the n+kth subframe at the nth subframe. Before performing PDSCH transmission on the scheduled subframe, the UE performs LBT to detect whether the channel is idle, the UE must finish the LBT within 1-2 symbols of the uplink subframe to perform the PDSCH transmission, a symbol number is determined by the length of the counter and is at most 2. The two symbols contain one uplink downlink conversion protection interval, an iCCA process, an eCCA process and a reserved signal after success of the eCCA. As shown in FIG. 2, assuming that the subframe 1 is a subframe called by the base station for the user, then the user finishes LBT in symbols #0 and #1 of the subframe 1.

In an LAA and Wi-Fi coexisting scene, since the Wi-Fi and the LAA contend for the resource, the base station cannot accurately determine an occupation condition of the subframe. In addition, LBT of the user has uncertainty, if the uplink LBT fails, the user cannot obtain a transmission chance on the scheduled subframe, and the base station requires performs uplink grant again. Meanwhile, in the LAA and Wi-Fi coexisting scene, such condition possibly occurs: although the UE1 LBT fails, UE2 LBT possibly passes, the base station cannot schedule UL for the UE2 aiming at the time frequency resource in time, and resource waste is caused.

SUMMARY

The present invention aims to solve a primary technical problem about providing an uplink resource sharing method.

The present invention aims to solve another technical problem about providing a base station for realizing foregoing uplink resource sharing.

The present invention aims to solve further technical problem about providing a terminal for realizing foregoing uplink resource sharing.

In order to realize the aims, the present invention adopts a following technical solution:

an uplink resource sharing method comprises following steps: performing the LBT on a granted subframe, allocated to a terminal by a base station, by the terminal; transmitting data if the LBT is finished on the granted subframe; and performing the LBT on another subframe if the LBT is not finished on the granted subframe.

The terminal performs LBT on a granted subframe allocated to the terminal by a base station; data is transmitted if the LBT is finished on the granted subframe; and LBT is performed on another subframe if the LBT is not finished on the granted subframe.

More preferably, when a plurality of terminals exist, if the LBT of the terminals on the granted subframe is all successful, the terminals finishing the LBT at first transmits and rest terminals do not transmit;

if the LBT of only one terminal in the terminals on the granted subframe is successful, the terminal transmits on the granted subframe;

if the LBT of the terminals on the granted subframe is all unsuccessful, no transmission is performed.

More preferably, the base station configures a transmission window for the terminal and sends window length information.

The transmission window comprises a granted subframe designated by the uplink grant, and one or more standby subframes.

More preferably, after the terminal is connected to the base station, the base station sends the window length information; or, The base station sends the window length information when requiring to schedule the terminal.

More preferably, the terminal performs LBT after receiving the uplink grant of the base station, and the terminal performs a standard LBT process on the granted subframe, and performs a strict LBT process on the standby subframes.

More preferably, in the strict LBT process, the terminal executes self back-off.

More preferably, the self back-off is performed by taking a CAA time slot as a unit; or The back-off counter takes a maximal value supported by the LBT process for self back-off.

More preferably, after the LBT on the standby subframe is successful, no reserved signal is sent till a maximal duration of the LBT of the subframe is finished or a reserved signal of other terminals is listened.

A base station for realizing foregoing uplink resource sharing issues an uplink grant signaling according to an uplink data request of a terminal, configures a transmission window for the terminal and sends window length information.

A terminal for realizing foregoing uplink resource sharing performs LBT on a granted subframe allocated to the terminal by a base station, transmits data if the LBT is finished on the granted subframe, and performs LBT on a standby subframe if the LBT is not finished on the granted subframe.

By configuring the transmission window for the terminal, the present invention solves the problem of resource waste caused by the fact that the terminal cannot finish LBT in a frame allocated to the frame by a base station, and reduces a probability of increase of an uplink grant number caused by failing of uplink scheduling, and the present invention provides a reasonable uplink resource sharing transmission window for an LAA device based on the uplink grant, and causes a user to fully use an uplink resource.

DETAILED DESCRIPTION

Technical content of the present invention is described in detail in combination with drawings and specific embodiments.

The present invention is suitable for a heterogeneous network scene that a cellular network and a wireless local area network (WLAN) coexist to content for a non-granted frequency band. The present invention uses interference environment diversity among different users to enable a plurality of uses to reuse the same uplink resource by an uplink grant-defined effective window in prior art. By configuration and scheduling of an LAA base station, a successful rate of uplink transmission of the LAA user is increased.

In order to increase the scheduling flexibility of the LAA uplink resource and improve an UL grant use rate in the LAA and WLAN coexisting scene, the present invention provides that the when LAA base station allocates the uplink PDSCH resource to UE, the effective window can be configured based on the UL grant, besides subframes granted for the UE by the base station, rest subframes in the transmission window all standby transmission subframes of the UE. In overlapping subframes of the transmission window of a plurality of users, the user adopts different LBT mechanisms, therefore, uplink resource sharing is realized.

Embodiment 1

Figure 3:
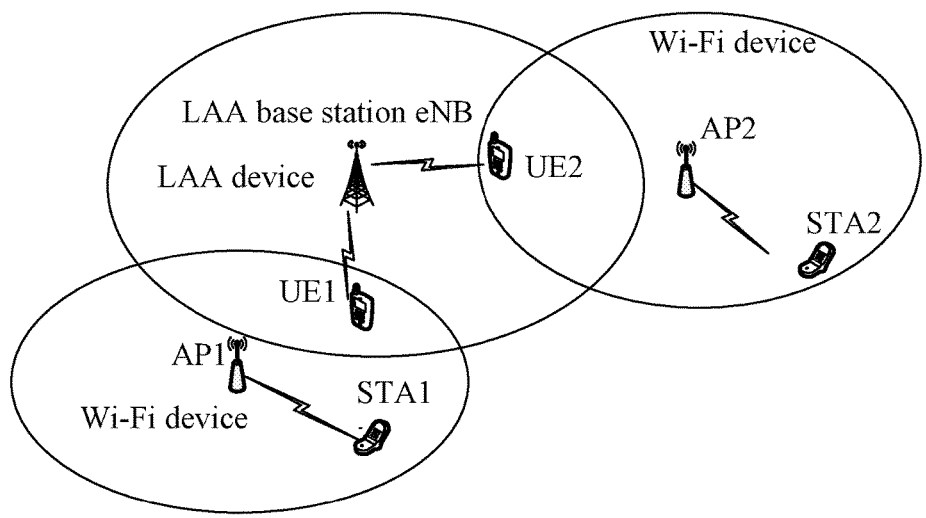
FIG. 3 is an example diagram of an LAA and Wi-Fi coexisting scene in present invention.

In the present embodiment, as shown in FIG. 3, in the LAA and Wi-Fi coexisting heterogeneous scene, UE1 and UE2 are user equipments supporting LAA and are connected with the LAA base station; UE3 is connected with a Wi-Fi access point. The UE1 and UE2 finish a standard LBT mechanism in an allocated granted subframe, that is, finish the LBT within front two symbols of the subframe needing to perform uplink transmission, and these two symbols contain one uplink to downlink conversion protection interval, an iCCA process, an eCCA process and a reserved signal after success of the eCCA, and a strict LBT process is performed in the standby subframe.

Figure 2:
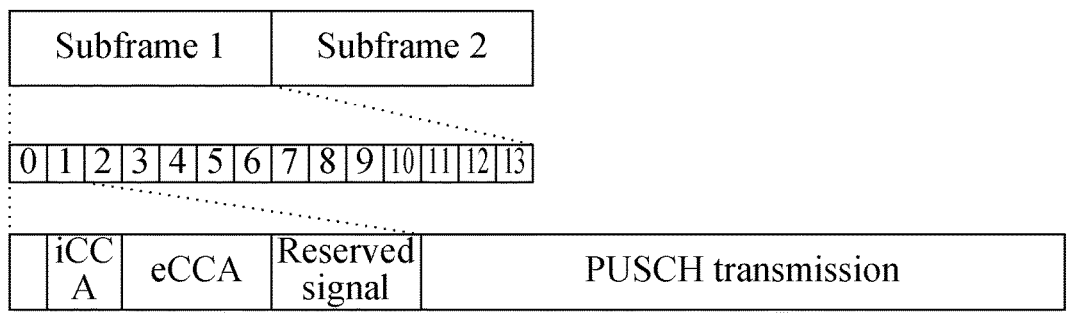
FIG. 2 is a relation schematic diagram of a transmission window and a subframe in prior art.

Assuming that the subframe 1 is a granted subframe allocated to the UE1 by the base station, according to prior art, the UE1 performs LBT in symbols #0 and #1 in the subframe 1, an LBT manner in the prior art as shown in FIG. 2 is defined as a standard LBT process, and if no complete LBT process is finished in the two symbols, CAA detection is considered to be failed.

By adopting the invention to realize the LBT manner, specific steps are as follows:

Step 1 Configuring a Transmission Window

Figure 4:
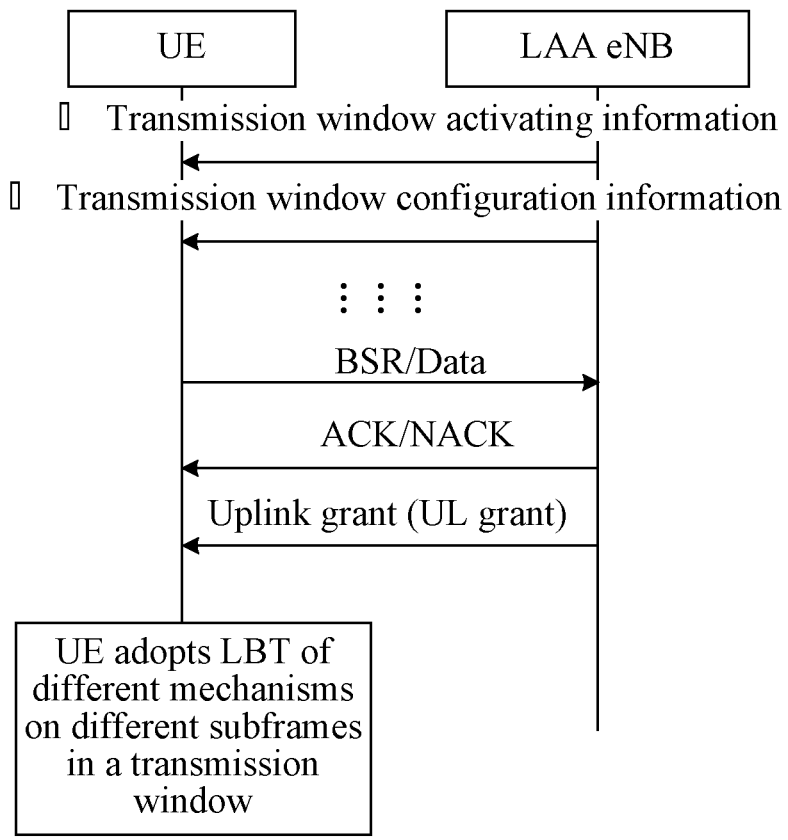
FIG. 4 is an interaction diagram of an LAA uplink transmission signaling in the present invention.
Figure 5:
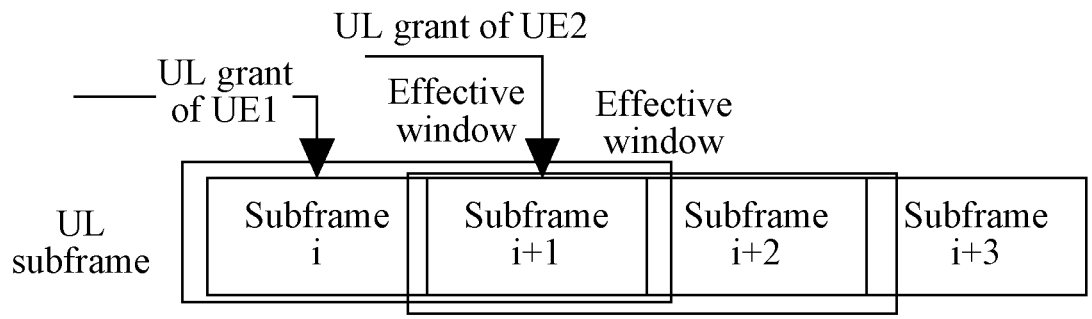
FIG. 5 is an example diagram of transmission window configuration in present invention.

As shown in FIG. 4, when scheduling the uplink transmission subframe for the UE, the base station configures a transmission window for the UE based on UL grant, configuration information comprises: ① an activating command and ② a window length information. For two pieces of information related to the transmission window issued by the base station, the activating command and the window length information can be sent separately or in one signaling, are not limited in a sending moment and can be sent together with the UL grant every time of scheduling, then the configuration information is carried by a physical layer signaling; semistatic configuration can also be performed, then the configuration information is carried by an RRC signaling, and when performing uplink transmission, the UE only needs to according with the latest received information. A UE-specific or cell-specific manner can be adopted. In this transmission window, besides the subframe granted by the base station, other subframes are standby subframes for the UE.

The configuration information denotes a specific design scheme for the transmission window and can comprise an offset and offset direction of corresponding subframe aiming at the UL grant, and a transmission window length; or contains an initial subframe and a terminating subframe number of the transmission window. The configuration information comprises window length information and activating information. The window length information represents the length and an initial position of the transmission window. Table 1 and table 2 respectively show examples of the activating information and the window length information, wherein, I is a subframe number scheduled or the UE by the base station. Front bits of the configuration information denote the window length (for example 2/3/4 bits) and the last two bits denote an offset digits, and the tables do not list all conditions. In an example in lower table, the activating command uses 1 bit to denote enabling ("1" condition in table) or de-enabling ("0" condition in table), the window length is denoted by 4 bits, the front 2 bits denote window length and the last 2 bits denote offset digits from the granted subframe. For example, "1001" denotes that the window length is 2, and forward moving by bit 1 is to subframe i from subframe i−1.

TABLE 1

| ① Activating information | |
| --- | --- |
| 0 | De-enabling |
| 1 | Enabling |

TABLE 2

| ② Window length information | Corresponding transmission window configuration manner |
| --- | --- |
| 1000 | Window length is 2, forward moving by bit 0, from subframe i to subframe i + 1 |
| 1001 | Window length is 2, front moving by bit 1, from subframe i − 1 to subframe i |
| 1110 | Window length is 3, front moving by bit 2, from subframe i − 2 to subframe i |

The following describes a sending mode of the activating information and window length information, and there are four sending modes different in mode and moment.

Figure 6:
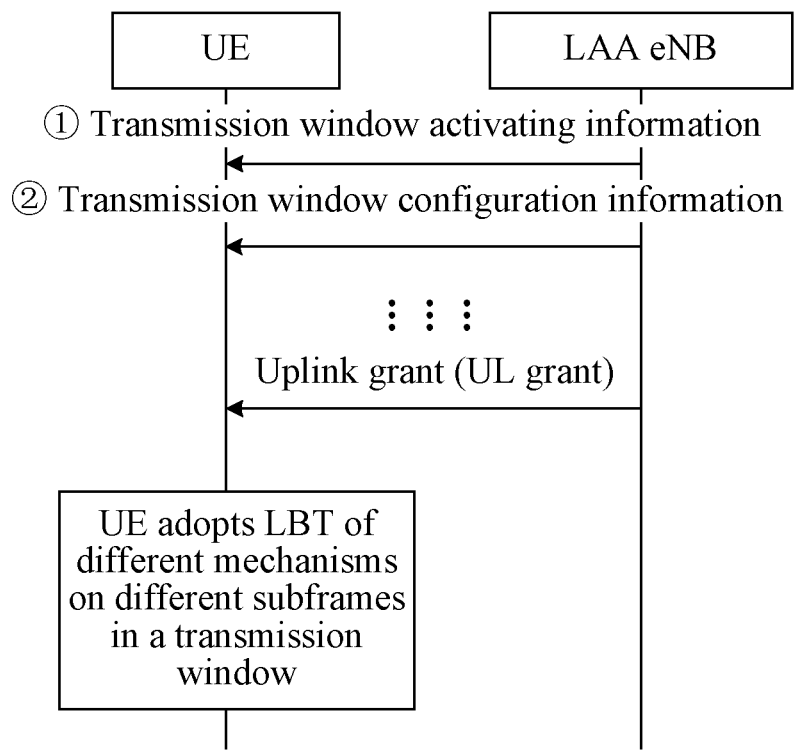
FIG. 6 is a flow schematic diagram of a transmission window configuration sending mode 1 in the present invention.

(1) The transmission window configuration information adopts a semistatic configuration mode and is carried by RRC layer signaling, after the UE is connected with the base station, the base station can send information ① activating information and ② window length information to the UE, and herein the two types of information are divided or combined and considered as one condition, as shown in FIG. 6.

Figure 7:
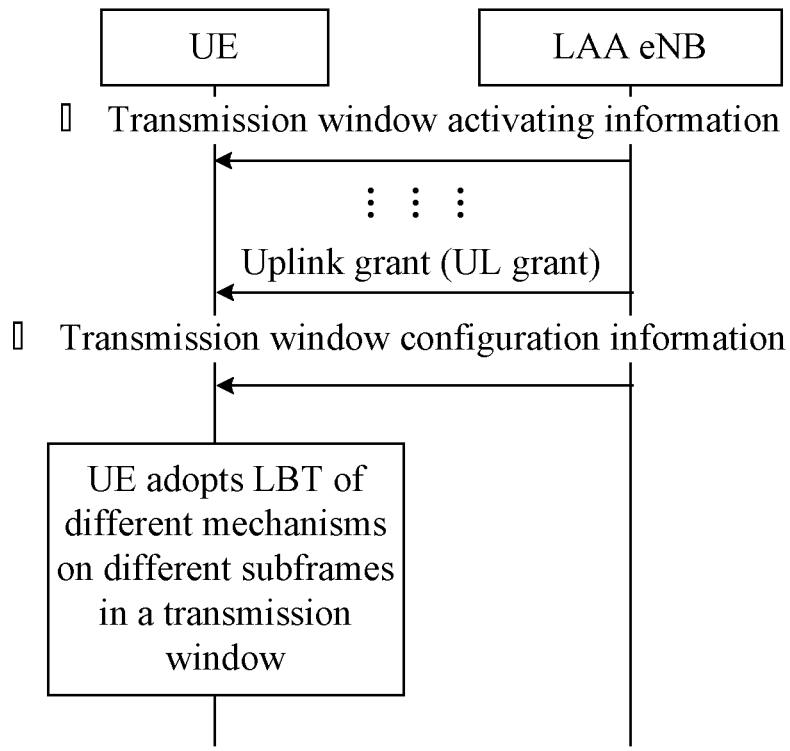
FIG. 7 is a flow schematic diagram of a transmission window configuration sending mode 2 in the present invention.

(2) after the UE is connected to the base station, the base station can send the information ① activating information to the UE, activates a contention window, and an RRC signaling carries the information. Afterwards, when the UE is required to be scheduled, the information ② window length information is sent, a specific interval of the transmission window is configured and is same as the UL grant and is carried by a physical layer signaling, as shown in FIG. 7.

Figure 8:
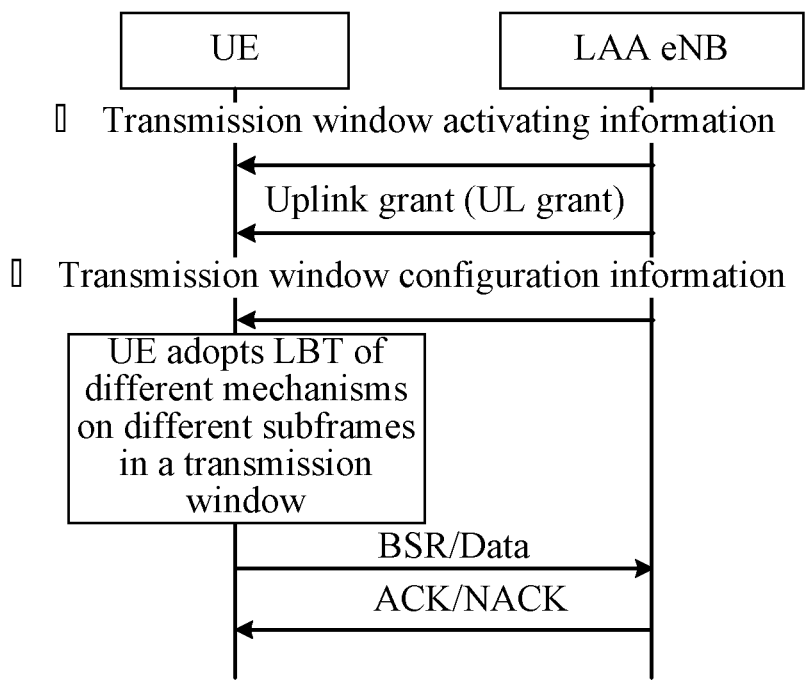
FIG. 8 is a flow schematic diagram of a transmission window configuration sending mode 3 in the present invention.

(3) after the use is connected with the base station, the base station can send the information ② window length information to the UE, a specific interval of the transmission window is configured and the RRC signaling carries the information. Afterwards, the information ① activating information needs to be resent when the UE is scheduled, the contention window is activated and is same as the UL grant, and the information is carried by the physical layer signaling, as shown in FIG. 8.

Figure 9:
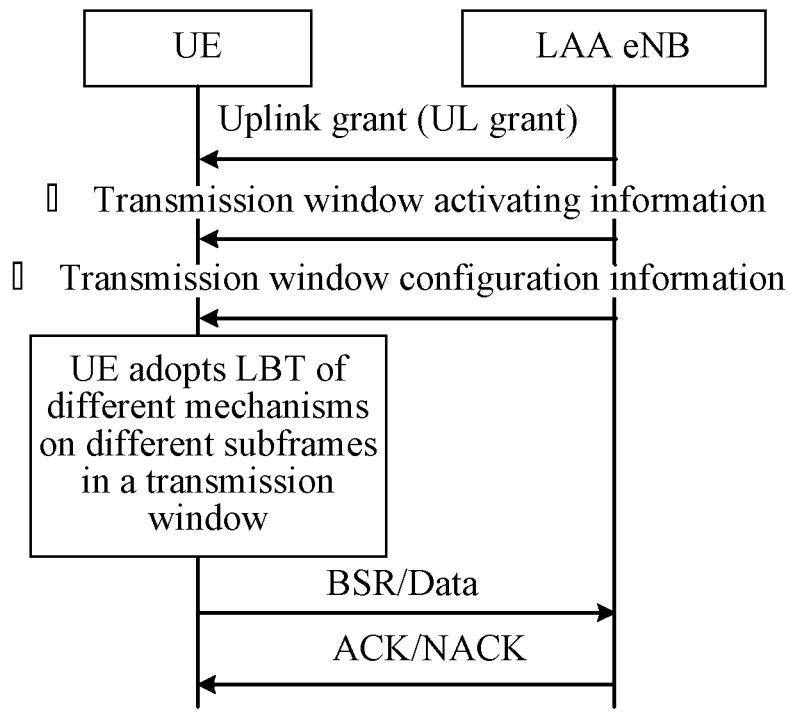
FIG. 9 is a flow schematic diagram of a transmission window configuration transmitting sending 4 in the present invention.

(4) when the UE needs to be scheduled, an uplink grant is sent, the ① activating information and ② window length information are sent to the UE, and herein the two types of information are divided or combined and considered as one condition, as shown in FIG. 9.

Thus it can be seen that a sending mode of the configuration information of the transmission window is very flexible, and can be configured according to actual business demands. If an interference environment of user reusing the resource is relatively stable, and the business type of the user is stable and periodic, the first semistatic configuration mode can be selected to save a physical layer signaling overhead.

Step 2 Uplink Grant

The base station schedules proper amount of resource for the user according to an uplink data request of the user and a data cache state report and sends corresponding uplink transmission grant.

Figure 10:
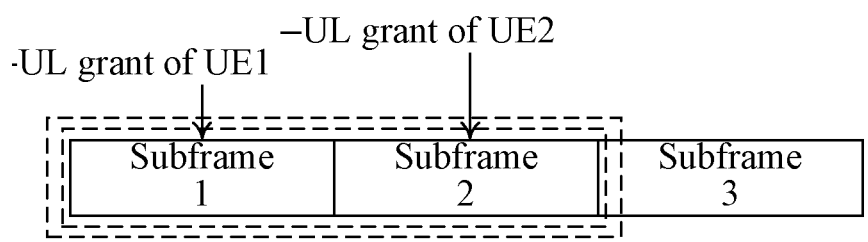
FIG. 10 is a schematic diagram of a transmission window configuration condition 1 in the present invention.

The following describes meaning of the configuration information of the transmission window in combination with a scene as shown in FIG. 3. Assuming that the granted subframe allocated to the UE1 is the subframe 1, and the granted subframe allocated to the UE2 is the subframe 2. If the configuration information ② received by the UE1 is 1000, and the configuration information ② received by the UE2 is 1001, then the transmission window of the UE1 and UE2 is as shown in FIG. 10. That is, since the window length information of the transmission window received by the UE1 is 1000 and denotes an offset is 0, then the UE1 can perform LBT on the granted subframe 1 and the next frame (subframe 2) of the granted subframe. The window length information of the transmission window received by the UE2 is 1001 and denotes an offset is 1, then the UE2 can perform LBT on the granted subframe 2 and the last frame (subframe 1) of the granted subframe. As shown in FIG. 10, the subframes on which the UE1 and UE2 can perform LBT are both the subframe 1 and subframe 2, serving as a transmission window.

Figure 11:
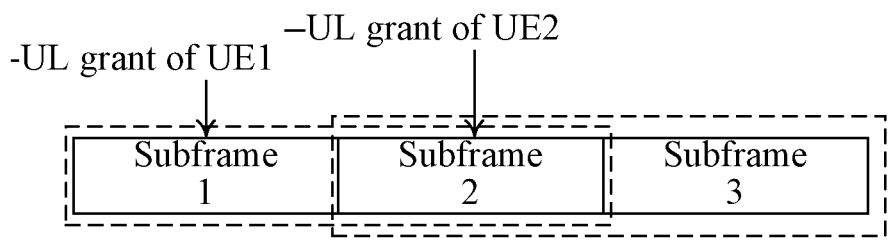
FIG. 11 is a schematic diagram of a transmission window configuration condition 2 in the present invention.

If the information ② received by the UE1 and UE2 are both 1000 (offset is 0), then the transmission windows of the two UEs are as shown in FIG. 11. The UE1 performs LBT in the subframe 1 and the subframe 2 (transmission window); and the UE2 performs LBT in the subframe 2 and the subframe 3 (transmission window).

Step 3 Uplink LBT

After the user receives the uplink grant, LBT can be performed in all subframes in the transmission window, but the process of performing the LBT in each subframe is different. In addition, the LBT is finished on the granted subframe and a reserved signal is sent; after the LBT is finished on the standby subframe, no reserved signal is sent till front 2 symbols of the standby subframes are finished or reserved signals of other UEs is listened, which intends to not interfere the uplink transmission of the user scheduled by the base station in the standby subframe (since the standby subframe is the granted subframe of other users).

Herein, the standby subframe is the subframe among the subframes indicated by the window length information of the transmission window besides the granted subframe. One or more standby subframes can be arranged.

A standard LBT process is performed in the granted subframe allocated by the base station, while a strict LBT process is performed in the standby subframe. The LBT process of the user in the standby subframe is stricter than the standard LBT process, "standard" and "strict" are relative since in the overlapping subframes (the subframe 1 and subframe 2 in FIG. 10 and the subframe 2 in FIG. 11), possibly a plurality of users perform the LBT, then the UEs are controlled to adopt different LBT processed in the subframe, which can ensure that the terminal allocated to the subframe by the base station (the granted subframe is the terminal of the subframe) from interference of other terminals (that is, the standby subframe is the terminal of the subframe).

Therefore, according to the assumption of the present embodiment, on the subframe 1, the UE1 and UE2 perform LBT at the same time, but since the subframe 1 is the granted subframe of the UE1, the UE1 adopts a standard LBT process, and since the subframe 2 is the standby subframe of the UE2, the UE2 adopts a strict LBT process.

Figure 1:
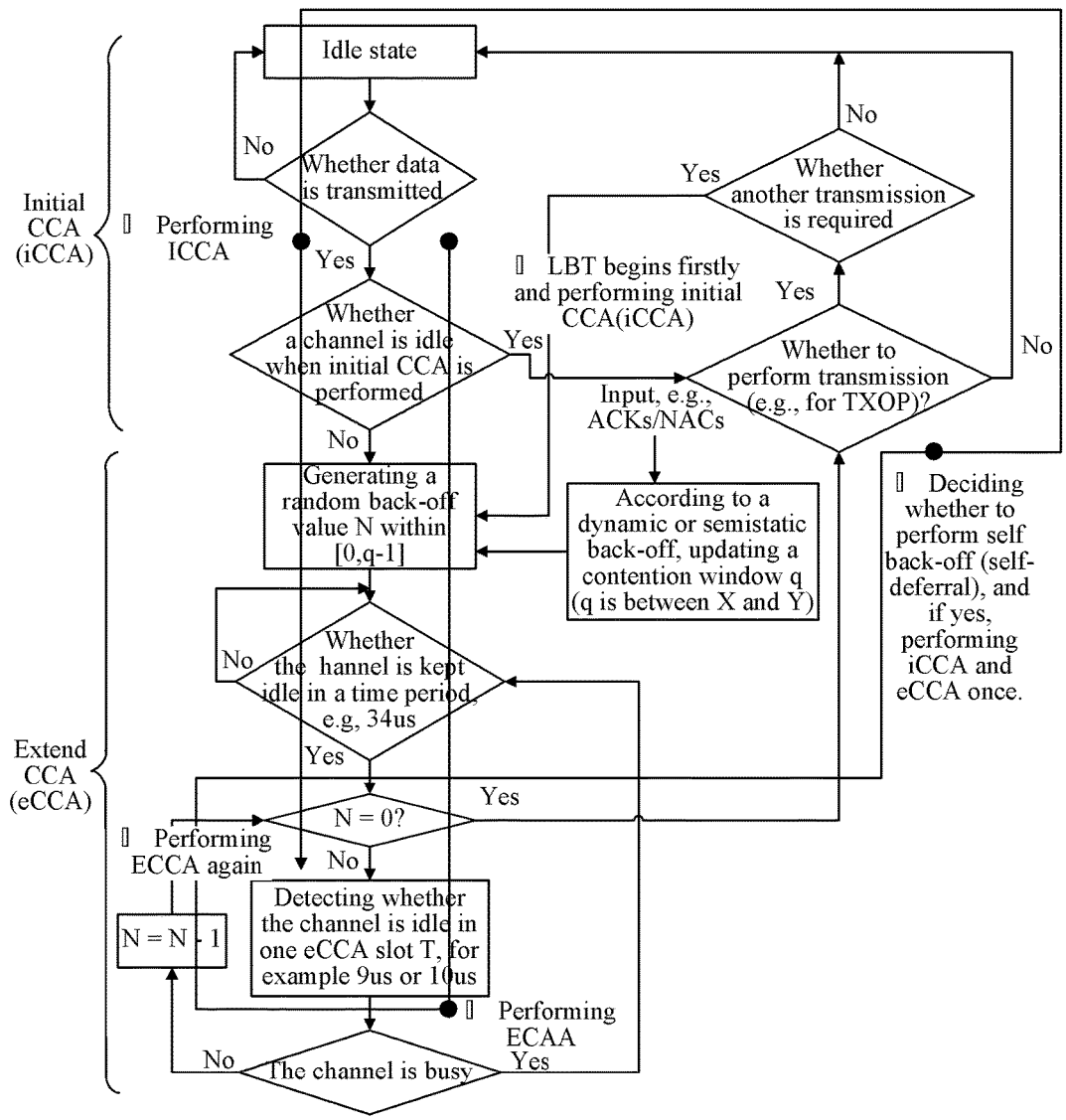
FIG. 1 is a flow chart of a fourth LBT in prior art.
Figure 12:
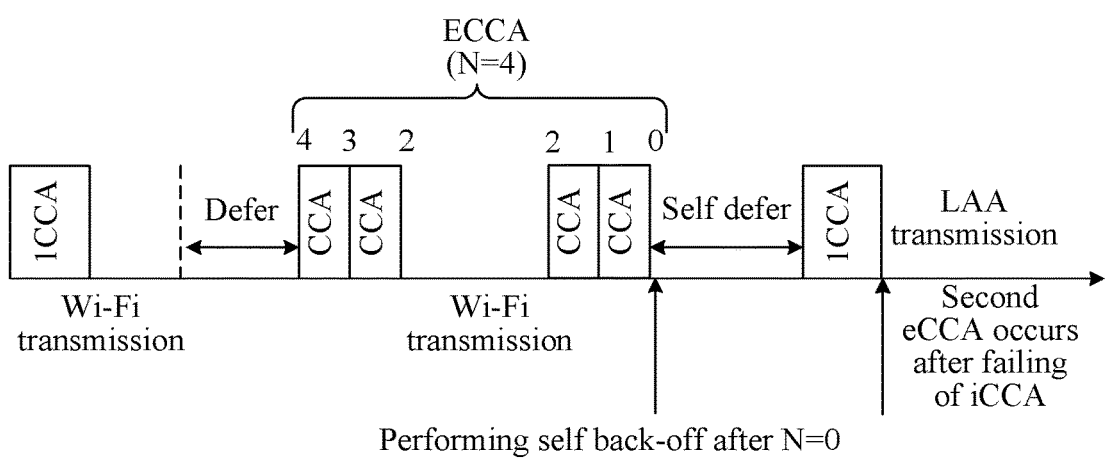
FIG. 12 is an example diagram of a strict LBT process in the present invention.

Here, the strict LBT process is to increase self back-off based on the standard LBT process, that is the LBT with the self back-off. As shown in FIG. 12, N is 0 in eCCA, that is, after a channel defer period is finished, self back-off is performed. The self back-off has many realizing manners, by taking the Cat.4LBT in FIG. 1 as an example, when N is 0 in eCCA, ③ is performed, if the maximal period of the LBT is not arrived, and the reserved signal of other terminals is not listened, self-back off is selected and performed. Then ④, is performed, and an ICCA process and an eCCA process are restarted, otherwise, ① is performed to judge. Since the terminal forcibly performs the strict LBT performs self back-off, a channel is not occupied before the LBT maximal period is finished, and a granted user is prevented from interference.

Self defer in the self back-off is same as the period of defer. Actually, increase of the self back-off is to continuously perform channel detection after the standard LBT process and aims to ensure that the user in low priority subframe (the subframe is the standby subframe of the user) finishes the LBT process after another user in high priority subframe (the subframe is the granted subframe of the user) since if the user with low priority finishing the LBT at firstly and sends a reserved signal, the reserved signal will interfere the user in high priority.

The LBT condition of one subframe is divided into three following conditions: (1) LBT of the two terminals are both successful on the subframe, then the terminal (the terminal owing the granted UL grant of the subframe) finishes the LBT at first transmits and the other terminal (the subframe is the standby subframe) does not transmit; (2) the LBT of only one terminal on the subframe is successful, then the successful terminal transmits on the subframe; (3) the LBT of all terminals on the subframe are unsuccessful, and no transmission is performed. Whether the unsuccessful terminal performs the LBT on the next subframe depends on that whether its transmission window contains the next subframe.

Step 4 Uplink Transmission

Once the effective transmission window of the UE is activated, after the UE receives the UL grant and performs the LBT in the transmission window, three following conditions will occur (assuming that the subframe allocated to the UE by the base station is subframe I and the transmission window of the UE is subframes [i−1, i+1]):

(1) after the UE successfully performs LBT on the subframe i−1, no other signals are listened to occupy the channel, and then the UE performs uplink transmission on the subframe i−1.

(2) the UE does not perform uplink transmission on the subframe i−1, successfully finishes LBT on the subframe I scheduled by the base station to the UE and sends a reserved signal, and then the UE can normally perform uplink transmission, causing no influence on a system.

(3) the UE does not successfully finish LBT in front two subframes of the transmission window, and then the UE has a chance of re-performing the LBT on the subframe i+1. If a transmission chance is obtained, then uplink PUSCH transmission is performed; if sending still fails, the next uplink grant of the base station is waited.

Figure 13:
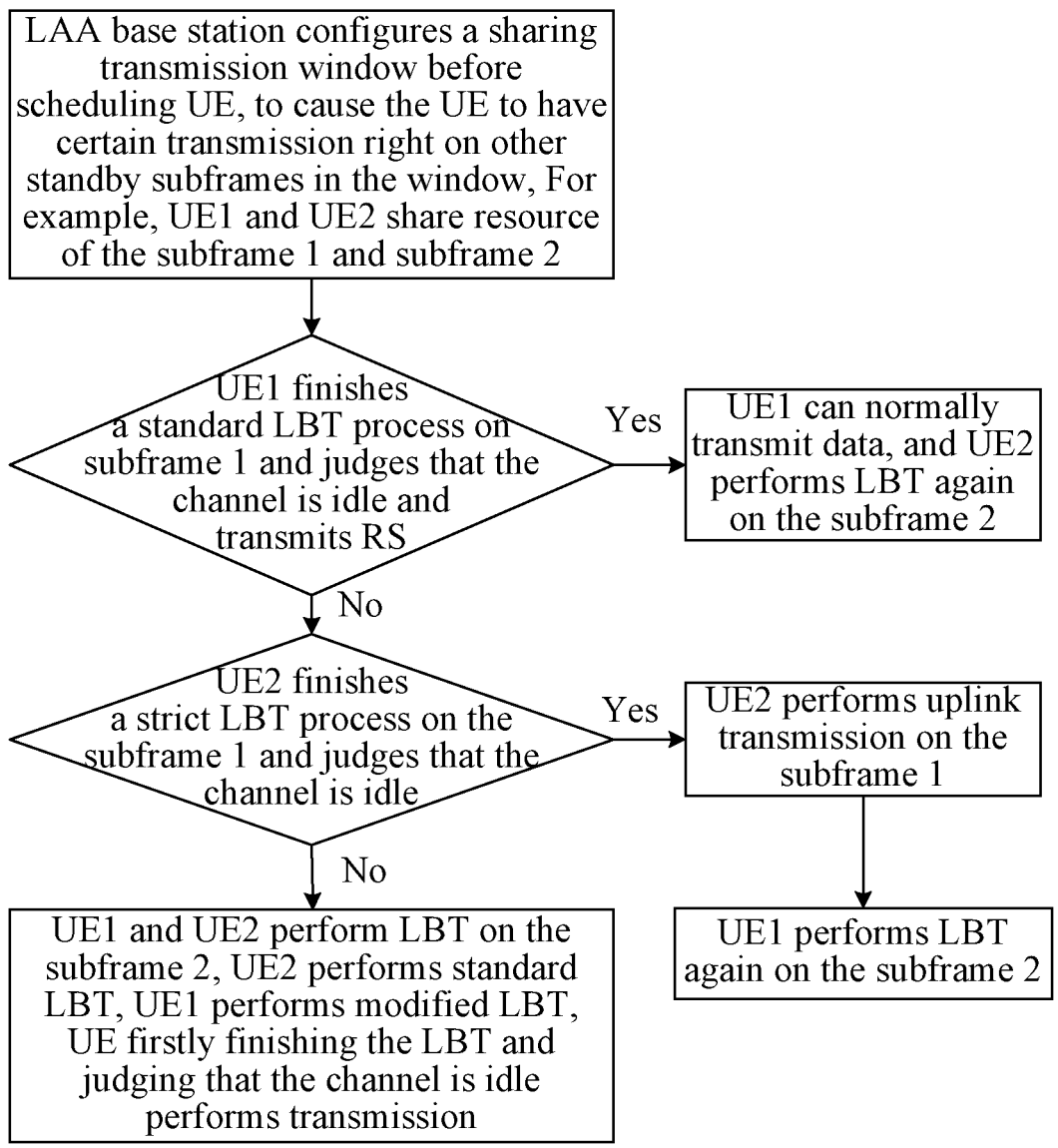
FIG. 13 is a first flow schematic diagram of an LAA terminal sharing uplink resource in the present invention.
Figure 14:
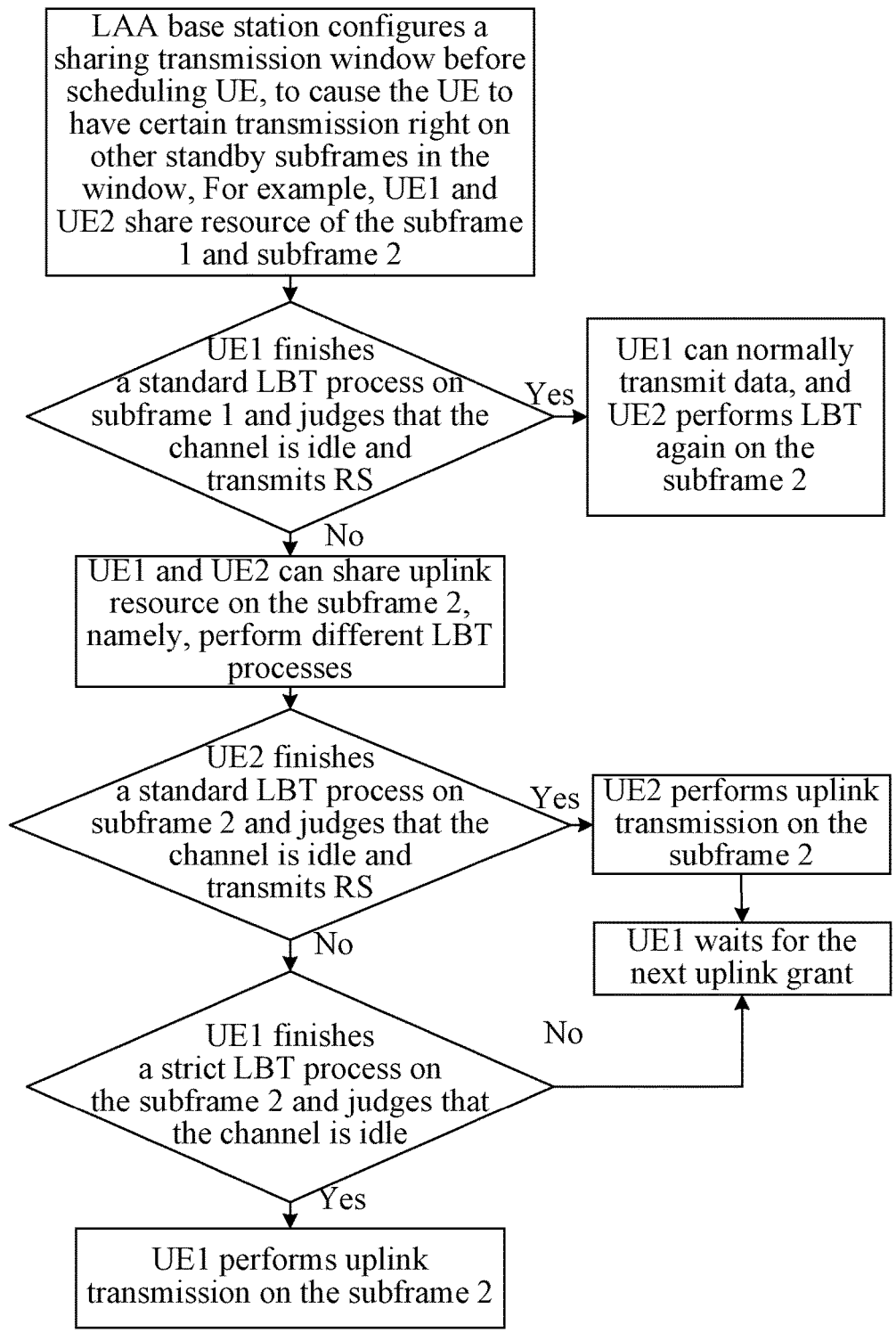
FIG. 14 is a second flow schematic diagram of an LAA terminal sharing uplink resource in the present invention.

An uplink PUSCH transmission process is described in detail in combination with FIG. 13 and FIG. 14.

Referring to FIG. 13, the condition of configuring the transmission window as shown in FIG. 10 is described at first, that is, the granted subframe of the UE1 is subframe 1, and the standby subframe is 2; the granted subframe of the UE2 is subframe 2 and the standby subframe is subframe 1. On the subframe 1, if the UE1 successfully finishes the LBT process, then the uplink transmission can be normally performed according to scheduling of the base station. If the LBT of the UE1 on the subframe 1 fails, and the LBT of the UE2 on the subframe 1 is successful, then the UE2 can perform uplink transmission on the subframe 1. If the LBT processes of the UE1 and UE2 on the subframe 1 both fail, then the LBT and corresponding transmission are performed on subframe 2 based on priority. In other words, since the subframe 2 is the standby subframe and the granted subframe of UE1, the UE1 performs strict LBT on the subframe 2, and the UE2 performs standard LBT on the subframe 2. The first terminal in the two terminals which finishes the LBT at first and judges that the channel is idle performs transmission.

Referring to FIG. 14, which indicates a condition of the transmission window configured as in FIG. 11, that is, the UE1 has the granted subframe being the subframe 1 and the standby subframe being subframe 2; and the UE2 has the granted subframe being the subframe 2 and the standby subframe being subframe 3. On the subframe 1, if the UE1 successfully finishes the LBT process, then uplink transmission can be normally performed according to the scheduling of the base station. If the LBT of the UE1 on the subframe 1 fails, then the UE1 performs uplink LBT on the subframe 2 together with the UE2. If on the subframe 2, the LBT of the UE2 fails and the LBT process of the UE1 is successful, then the UE1 performs transmission on the subframe 2, and the UE2 re-performs LBT on the subframe 3. If on the subframe 2, the LBT of the UE2 is successful, then the UE2 normally transmits data according to the scheduling of the base station, and the UE1 waits for the next uplink grant of the base station.

According to the present invention, as for a problem that in a WLAN and LAA coexisting scene, the LAA device does not always successfully perform PUSCH transmission in a resource scheduled by the base station, a section of effective transmission window is configured to the UE by the LAA base station, and a grant range of the UL grant is increased. Meanwhile, by controlling a condition that different users use different LBT processes in the same subframe, a probability of successful transmission of the UE is improved, an uplink PUSCH resource is fully used and transmission of making use of every space is realized.

Second Embodiment

Figure 15:
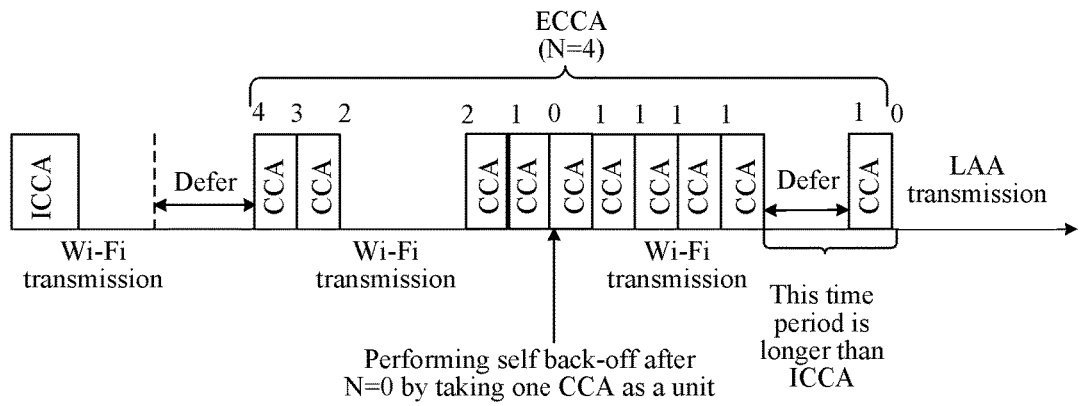
FIG. 15 is a strict LBT process schematic diagram taking one CAA time slot as a unit in the present invention.

The following describes the second embodiment in combination with FIG. 15. Difference between the second embodiment and the first embodiment is introduced herein and the same portions are not repeated.

As shown in FIG. 15, a strict LBT process in the present embodiment is different from that in first embodiment.

Mode 1, self back-off is performed based on the standard LBT process, however, not complete iCCA and eCCA are performed after the self back-off, and one CCA time slot is taken as a nit (each time slot is 9 microseconds) and the process is as shown in FIG. 15.

Mode 2, when LBT is performed, no matter the iCCA is successful or not, the eCCA process is performed, and the back-off counter N in the eCCA is not a random value and is a maximal value supported in the current LBT mechanism.

Knowing that a period of front symbols in each subframe is about 42 microseconds, a protection interval period is 16 microseconds, iCCA period is 25 microseconds and the defer period after each CCA time slot detects that the channel is busy is 25 microseconds. Assuming that every time CCA channel is idle, and then the allowable maximal back-off number is $N=(142-16-25)/9≈11$.

Here, the N is maximally 11, since the maximal contention window length in the uplink LBT being discussed in the existing standard is tentatively 7, a value set of N in the present embodiment can be {7, 8, 9, 10, and 11}.

The present invention solves the problem of resource waste since the terminal cannot finish LBT in a frame allocated to the terminal by a base station, and reduces a probability of increase of an uplink grant number caused by failing of uplink scheduling, and the present invention provides a reasonable uplink resource sharing transmission window for an LAA device based on the uplink grant and causes a user to fully use the plink resource.

In the present invention, according to an uplink data request of the terminal, the base station issues an uplink grant signaling, configures the transmission window for the terminal and sends window length information. The transmission window comprises a granted subframe designated by uplink grant and one or more standby subframes. The window length information represents the length of the transmission window and an initial position. After the terminal is connected to the base station, the base station sends the window length information to the terminal or the base station does not send the window length information till needing to schedule the terminal.

More preferably, the base station can send activating information. The base station sends the activating information after being connected with the terminal and can send when needing to schedule the terminal.

Figure 16:
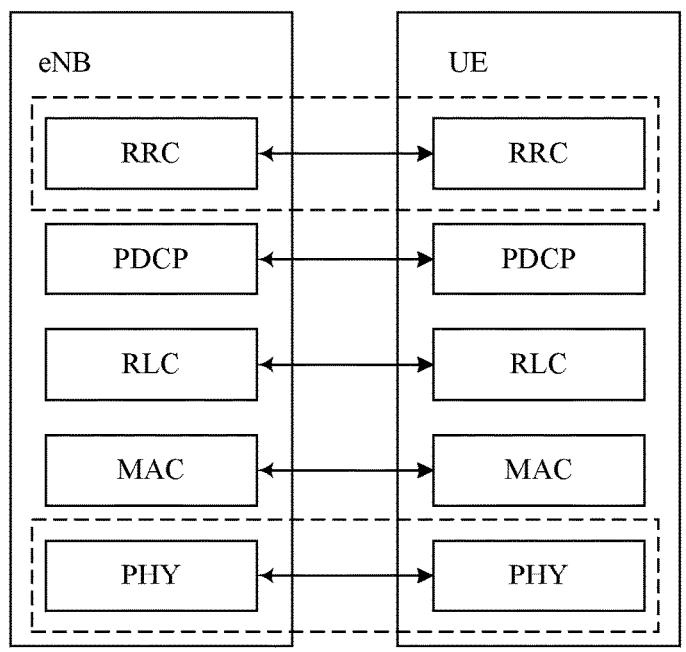
FIG. 16 is a schematic diagram of an interaction protocol stack of a base station and a terminal in the present invention.

As shown in FIG. 16, the window length information and activating information of the transmission window can be sent together with the UL grant at every time of scheduling and also be subjected to semistatic configuration by an RRC signaling. If sent together with the UL grant, then the window length information and activating information are carried by a physical layer (PHY) same as the UL grant, and if configured by the RRC signaling, the window length information and activating information are generated by an RRC layer.

In the present invention, the terminal used for realizing uplink resource sharing performs LBT on the granted subframe allocated to the terminal by the base station; if the LBT is finished on the granted subframe, data is transmitted; if the LBT is not finished on the granted subframe, the LBT is performed on the standby subframe. After receiving the uplink grant of the base station, the terminal performs LBT, performs the standard LBT process on the granted subframe and performs a strict LBT process on the standby subframe.

when a plurality of terminals exist, if the LBT of the terminals on the granted subframe is all successful, the terminals finishing the LBT at first transmits and rest terminals do not transmit; if the LBT of only one terminal in the terminals on the granted subframe is successful, the terminal transmits on the granted subframe; and if the LBT of the terminals on the granted subframe is all unsuccessful, no transmission is performed.

FIG. 16 is a protocol stack structural diagram of an interaction signaling between the base station and the terminal. The window length information and activating information of the transmission window can be sent together with the UL grant at every time of scheduling and also be subjected to semistatic configuration by an RRC signaling. If sent together with the UL grant, then the window length information and activating information are carried by a physical layer (PHY) same as the UL grant, and if configured by the RRC signaling, the window length information and activating information are generated by an RRC layer. The terminal receives the window length information and activating information by the uplink grant UL grant or the RRC layer and the base station, thereby realizing that the standard LBT process is performed on the granted subframe and the strict LBT process is performed on the standby subframe.

The above describes the method, base station and terminal for realizing the uplink resource sharing according to the present invention. A person of ordinary skill in the art performing any obvious change without departing from the essence and spirit of the present invention will violate a patent right of the present invention and should undertake corresponding legal responsibility.

What is claimed is:

1. An uplink resource sharing method, characterized by comprising following steps:
   a transmission window comprising a first granted subframe designated by the uplink grant, and a standby subframe;
   a first terminal performing an LBT (listen-before-talk) on the first granted subframe allocated for the first terminal;
   a second terminal performing an LBT on the standby subframe, which is a granted subframe for the second terminal; and
   the first terminal transmitting data via the first granted subframe if the LBT is finished on the first granted subframe, or the first terminal performing the LBT on the standby subframe if the LBT is not finished on the first granted subframe.

2. The uplink resource sharing method according to claim 1, characterized in that:
when a plurality of terminals exist, if all of the terminals successfully perform the LBT on the granted subframe, the terminals finishing the LBT at first transmits and other terminals do not transmit;
if only one terminal of the terminals successfully performs the LBT on the granted subframe, the only one terminal transmits on the granted subframe; and
if none of the terminals successfully performing the LBT on the granted subframe, none of the terminals transmits.

3. The uplink resource sharing method according to claim 1, characterized in that:
the second terminal performs the LBT on the first granted subframe if the first terminal cannot finish the LBT on the first granted subframe, and
the first granted subframe is allocated to the second terminal as the standby subframe.

4. The uplink resource sharing method according to claim 3, characterized in that:
after the first terminal is connected to the base station,
the base station sends the window length information, or the base station sends the window length information at the time to schedule the first terminal.

5. The uplink resource sharing method according to claim 3, characterized in that:
the first terminal performs LBT after receiving the uplink grant of the base station;
the first terminal performs a standard LBT process on the first granted subframe, and performs a strict LBT process on the standby subframe; and
the self back-off is to continuously perform channel detection after the standard LBT process if the maximal period of the LBT is not arrived.

6. The uplink resource sharing method according to claim 5, characterized in that:
in the strict LBT process, the first terminal executes self back-off within the transmission window.

7. The uplink resource sharing method according to claim 6, characterized in that:
the self back-off is performed by a CAA (Clear Channel Assessment) time slot; or
the back-off counter takes a maximal value supported by the LBT process for self back-off.

8. The uplink resource sharing method according to claim 6, characterized in that:
after the LBT is successfully performed by the first terminal on the standby subframe, reserved signal is not sent until a maximal duration of the LBT is finished or a reserved signal is listened from a terminal other than the first terminal.

9. The uplink resource sharing method according to claim 6, characterized in that:
the self-back off is selected and performed if the maximal period of the LBT of the first terminal is not arrived, and reserved signal is not listened from a terminal different from the first terminal.

10. The uplink resource sharing method according to claim 7, characterized in that:
the self-back off is selected and performed if the maximal period of the LBT of the first terminal is not arrived, and reserved signal is not listened from a terminal different from the first terminal.

* * * * *